Jan. 5, 1960     E. T. LORIG     2,919,793
AUTOMATIC SELF-CENTERING PULLEYS FOR BELT CONVEYORS
Filed Dec. 23, 1953     2 Sheets-Sheet 1
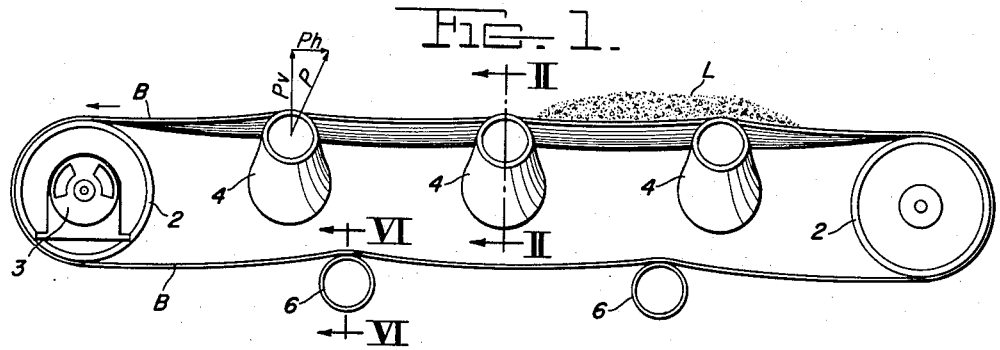
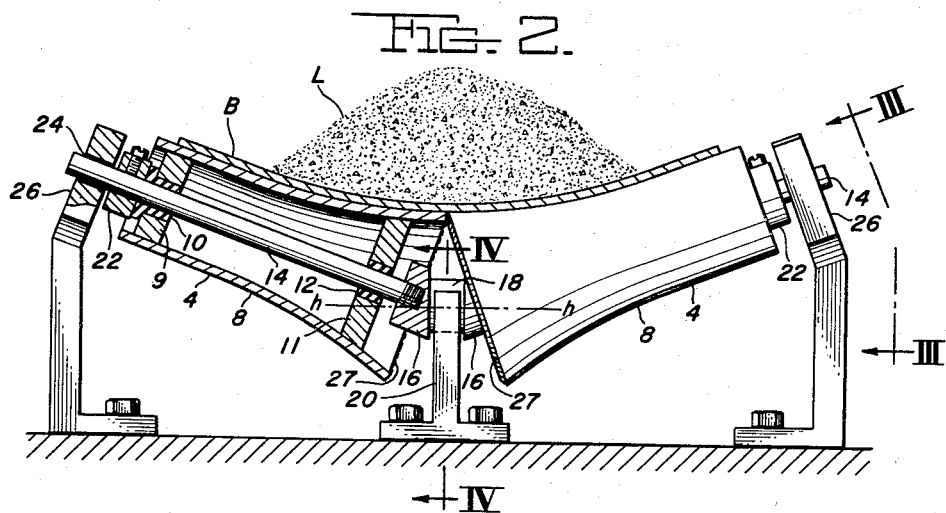
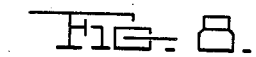
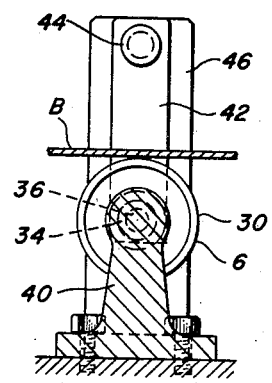
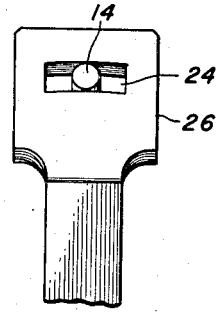
INVENTOR:
EDWIN T. LORIG,
BY: Donald G. Dalton
his Attorney.

Jan. 5, 1960

E. T. LORIG 2,919,793

AUTOMATIC SELF-CENTERING PULLEYS FOR BELT CONVEYORS

Filed Dec. 23, 1953

INVENTOR:
EDWIN T. LORIG,
BY: Donald G. Dalton
his Attorney.

United States Patent Office

2,919,793
Patented Jan. 5, 1960

2,919,793

AUTOMATIC SELF-CENTERING PULLEYS FOR BELT CONVEYORS

Edwin T. Lorig, Pittsburgh, Pa., assignor to United States Steel Corporation, a corporation of New Jersey Application December 23, 1953, Serial No. 399,897

1 Claim. (Cl. 198—202)

This invention relates to automatic self-centering pulleys or rolls for belt conveyors and more particularly to pulleys which can be used with reversing conveyors. Conventional belt conveyors usually include a fabric or rubber belt passing over crowned drive and tail pulleys. The loaded belt is supported by troughing idler pulleys spaced at intervals between the head and tail pulleys and the return run of the belt is usually supported on flat idler pulleys. The only elements in this conventional conveyor which can align the belt are the drive and tail pulleys. The troughing and return idlers do not have any centering ability and if incorrectly adjusted will actually drive the belt out of alignment. For these reasons it is often difficult to keep the belt aligned, and with reversing belts it is sometimes almost impossible to make the belt track properly. Instead of stationary idlers belt training devices such as center swivel-mounted idlers are used along the length of the belt. Most devices in general use are for unidirectional belt operation and depend for their operation on pressure or friction on the edge of the belt, this resulting in damage to the belt itself. Swivelling devices require careful maintenance since failure of an idler to swivel will aggravate tracking difficulties. Since the corrective effects of such devices remain in full force as the belt approaches the center, the belt instead of moving to the center and staying there will hunt. In other words, it will move from side to side of the center line.

It is therefore an object of my invention to provide idler pulleys for belt conveyors which will center the belt regardless of direction of travel without damaging the edge of the belt.

Another object is to provide such pulleys which do not include a swivelling element and in which the centering force diminishes as the belt approaches the center.

These and other objects will be more apparent after referring to the following specification and attached drawings, in which:

Figure 1 is an elevation of a belt conveyor system to which self-centering idler pulleys have been applied;

Figure 2 is a view, partly in section, taken on the line II—II of Figure 1 and showing the details of an automatic self-centering troughing idler pulley;

Figure 3 is a view taken on the line III—III of Figure 2;

Figure 4 is a view taken on the line IV—IV of Figure 2;

Figure 8 is a view taken on the line VIII—VIII of Figure 6.

Figure 5:
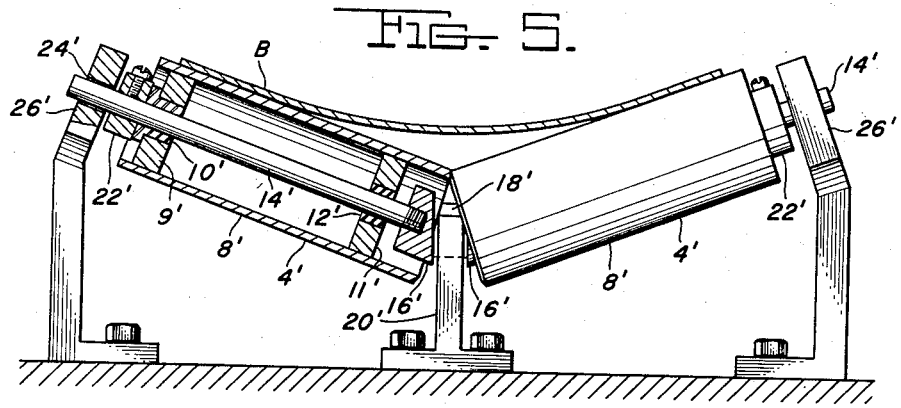
Figure 5 is a view, similar to Figure 2 showing a slight modification of the automatic self-centering troughing idler pulleys.

Referring more particularly to the drawings, reference numeral 2 indicates a pair of spaced apart head and/or tail pulleys around which a belt B travels. Pulleys 2 may be cylindrical, crowned or automatic self-centering and the belt may be driven in either direction by means of a motor 3. A plurality of spaced apart troughed idler pulleys 4 are provided for the top run of the belt B and a plurality of spaced apart flat idler pulleys 6 are provided for the bottom run of the belt. A load L is supported on the upper run of the belt B. As shown in Figures 2 to 4, the rolls 4 consist of identical substantially frusto-conical shells or rollers 8 each supported by the web 9 in bearing 10 and by web 11 in bearing 12. The bearings 10 and 12 are supported on a shaft 14. The axes of the shafts 14 are arranged at an angle to the horizontal in a common vertical plane. The shells 8 are shaped so that they touch on the vertical center line of the assembly and form a belt supporting surface of the desired troughed shape. The lower ends of the shafts 14 are threaded into a member 16 having a cylindrical portion 18 which may rotate a slight amount about its horizontal axis $h$—$h$. The axes of the shafts 14 intersect on the horizontal axis $h$—$h$. The cylindrical portion 18 is supported in a trunnion bearing 20. The upper end of each shell 8 is prevented from moving upwardly by means of a collar 22 which is fastened to the shaft 14 and bears against the upper bearing 10. The upper end of each of the shafts 14 is supported for movement in an arcuate slotted opening 24 in a bracket 26. Gear teeth 27 are preferably arranged on the adjacent ends of shells 8 to provide for positive rotary synchronous movement thereof.

The operation of the device is as follows:

Assuming that the belt is moving from right to left as seen in Figure 1, and that the belt hangs in shallow loops between each pair of troughing idlers, each particle of the load L will change its direction of travel as it follows the loop. The force required to change the direction of the belt B is provided by the pressure of the pulley against the belt, this pressure being indicated by the arrow P in Figure 1. Pressure P has a horizontal component $Ph$ which causes the shafts 14 to rotate about axis $h$—$h$ in the direction of belt travel to the one end of slots 24. The movement of the ends of the shaft 14 causes a toe-in effect on the pulley shells 8 which produces a centering effect on the loaded belt in the same manner as the rolls disclosed in my prior Patent No. 2,593,157, dated April 15, 1952. As the direction of belt travel is reversed the direction of force P is also reversed and the shafts 14 will rotate about axis $h$—$h$ in the opposite direction and to the opposite end of the slots 24.

In the embodiment of my invention shown in Figure 5, the construction and operation is the same except that the shells 8' are cylindrical rather than substantially frusto-conical. Thus the belt B will be supported on its ends but not at its center. Those parts in Figure 5 corresponding to the parts of Figure 2 are indicated by priming the reference numerals as applied in Figure 2. This roll is used particularly with metal belts.

Figure 6:
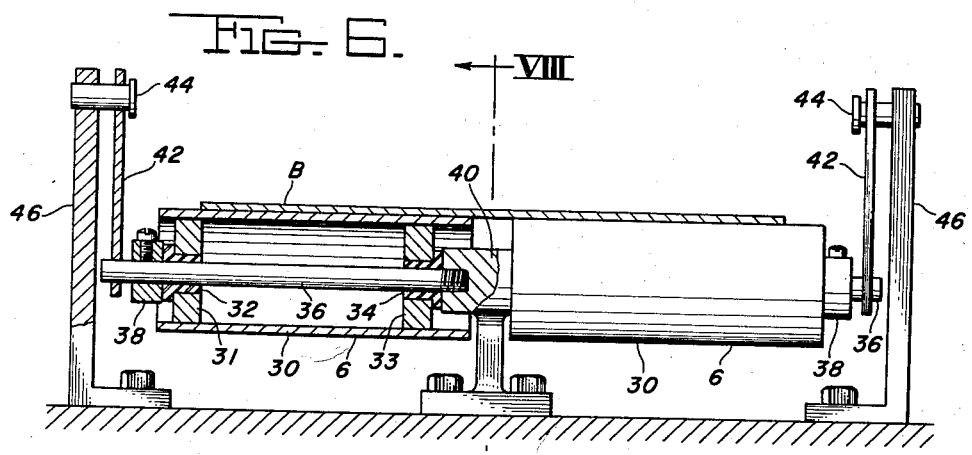
Figure 6 is a view taken on the line VI—VI of Figure 1 and showing an automatic self-centering return idler pulley.
Figure 7:
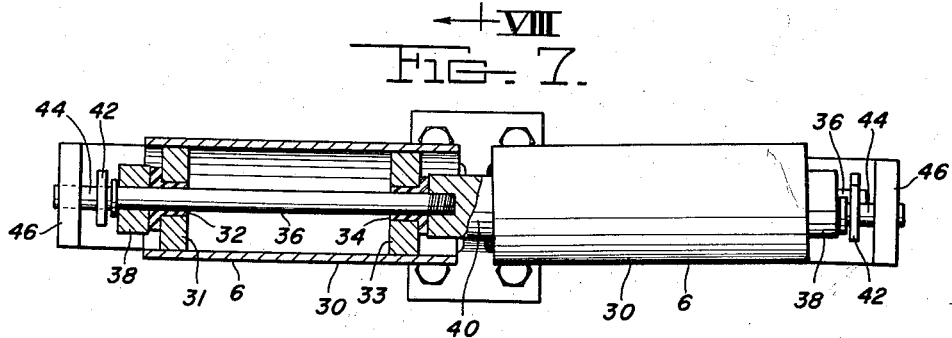
Figure 7 is a plan view, partly in section, of the roll of Figure 6.

The return idler pulley shown in Figures 6 to 8 consists of two identical cylindrical shells 30 each supported by the web 31 in bearing 32 and by web 33 in bearing 34. The bearings 32 and 34 are mounted on a shaft 36. A collar 38 at the outer end of each shaft 36 prevents outward movement of the shells 30. Suitable means (not shown) may be provided for causing positive rotary synchronous movement of the shells 30. The shafts 36 are horizontally cantilevered symmetrically about and at right angles to the center line of the conveyor by means of a common support bracket 40 into which the shafts are threaded. The outer or free end of each shaft 36 is supported by a link 42 which in turn is pivotally mounted at its upper end by means of a pin 44 carried by a bracket 46. It will be seen that the shafts 36 can move in a substantially horizontal plane without any substantial movement in a vertical plane. As the belt B passes over the roll 6 in the direction shown in Figure 1, the shafts 36 and shells 30 are deflected horizontally at their outer ends in the direction of travel, thus providing a toe-in effect which causes a belt centering effect similar to that described above in discussing the operation of the roll of Figures 2 to 5.

While several embodiments of my invention have been shown and described it will be apparent that other adaptations and modifications may be made without departing from the scope of the following claim.

I claim:

Automatic self-centering pulleys for belts or the like comprising a pair of opposed rotatable rollers, a separate shaft for each of said rollers, the axes of said shafts extending upwardly and outwardly from their adjacent ends and normally being in a common vertical plane, shaft mounting means for preventing movement of the adjacent ends of said shafts in vertical and horizontal directions, said means including a member having a generally horizontal cylindrical portion, means attaching the inner end of said shafts to said member and a trunnion bearing for supporitng said cylindrical portion, the axes of said shafts intersecting on the axis of said cylindrical portion, and mounting means for the outer end of each shaft permitting simultaneous and independent limited longitudinal movement of said outer ends in the direction of travel of said belt.

References Cited in the file of this patent

UNITED STATES PATENTS

| | | |
|---|---|---|
| 1,344,171 | Byron | June 22, 1920 |
| 2,179,186 | Kendall | Nov. 7, 1939 |
| 2,195,159 | Wood | Mar. 26, 1940 |